United States Patent [19]

Horsch

[11] Patent Number: 4,844,127

[45] Date of Patent: Jul. 4, 1989

[54] ACTUATING MECHANISM FOR A TRANSMISSION CONTROL SYSTEM

[75] Inventor: Joachim Horsch, Lombard, Ill.

[73] Assignee: J. I. Case Company, Racine, Wis.

[21] Appl. No.: 190,493

[22] Filed: May 5, 1988

[51] Int. Cl.⁴ .................... F16K 31/02; F16K 31/528
[52] U.S. Cl. .................................. 137/637.1; 74/55;
74/337.5; 137/596.14; 137/596.16; 251/252;
251/253; 251/263
[58] Field of Search ............... 74/55, 337.5, 475, 867;
192/3.55, 3.62; 137/637, 637.1, 637.2, 596,
596.14, 596.16; 251/251, 252, 253, 263

[56] References Cited

U.S. PATENT DOCUMENTS

| 2,092,446 | 9/1937 | Fleischel | 192/3.55 |
| 2,316,408 | 4/1943 | Dawson | 74/55 |
| 2,529,379 | 11/1950 | Dumont | 192/3.62 |
| 2,654,326 | 10/1953 | Sheen et al. | 74/55 |
| 2,924,124 | 2/1960 | Froslie | 74/475 |
| 2,943,501 | 7/1960 | Stapleton | 74/475 |
| 2,966,972 | 1/1961 | Nallinger | 74/337.5 |
| 3,089,571 | 5/1963 | Schick | 74/337.5 |
| 3,485,315 | 12/1969 | Bergren | 137/637.1 |
| 3,524,523 | 8/1970 | Klimex et al. | 137/637.1 |
| 4,293,059 | 10/1981 | Lucas | 192/3.62 |
| 4,729,408 | 3/1988 | Coutant | 137/637.1 |

FOREIGN PATENT DOCUMENTS 11991 of 1887 United Kingdom .

Primary Examiner—George L. Walton
Attorney, Agent, or Firm—Dressler, Goldsmith, Shore, Sutker & Milnamow, Ltd.

[57] ABSTRACT

An actuating mechanism for a hydraulic control system including a valve body having one or more valves slidably arranged therein. Each valve is movable along a linear path in a manner regulating fluid flow through the valve body as a function of the linear position of the valve. The actuating mechanism includes a rotatable cam for selectively positioning each valve relative the valve body. Each valve is operatively connected to the cam such that each valve is positioned as a function of cam rotation. The cam is rotated about an axis extending substantially perpendicular to the linear path of each valve.

22 Claims, 2 Drawing Sheets

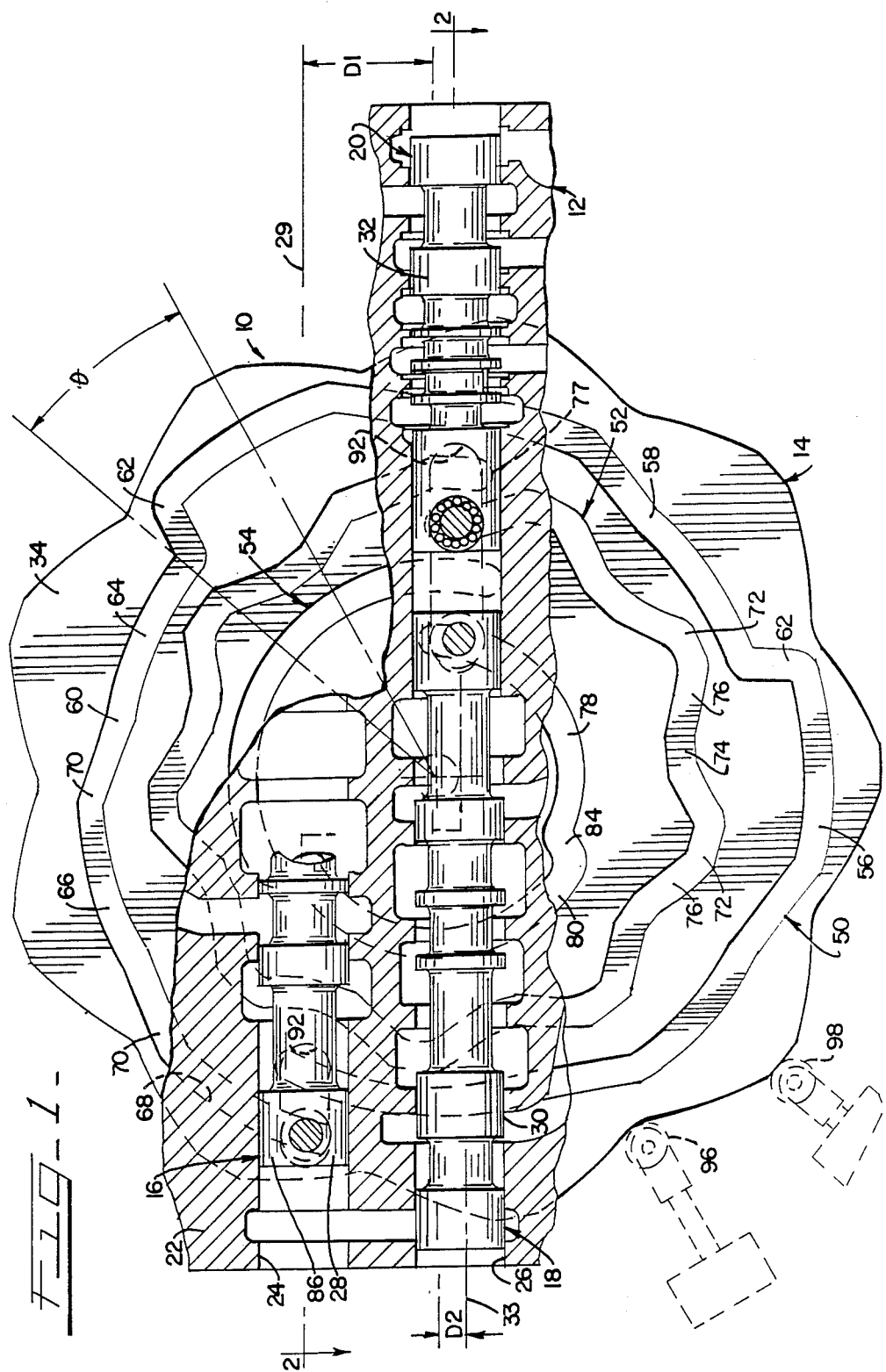

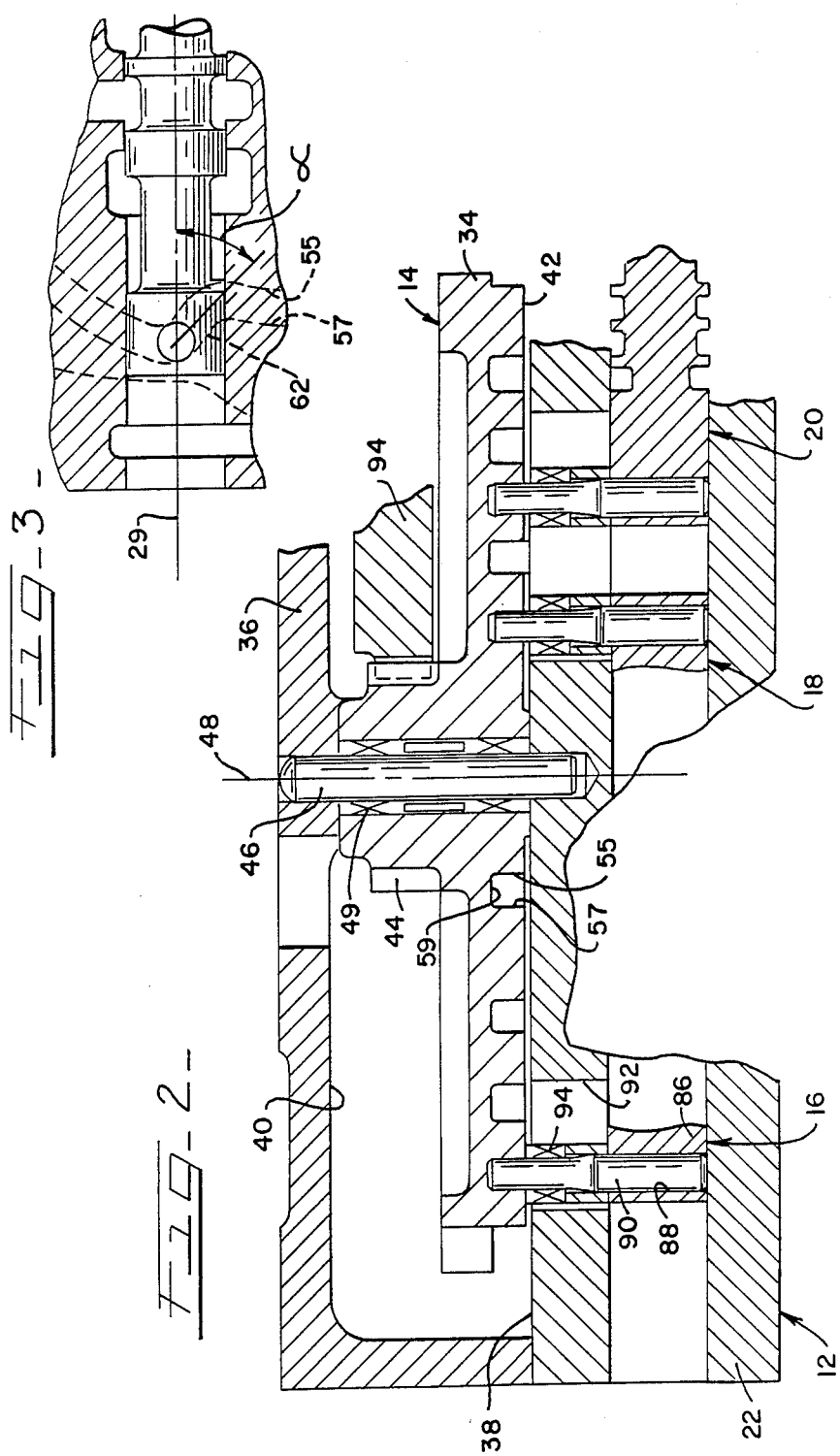

ACTUATING MECHANISM FOR A TRANSMISSION CONTROL SYSTEM

FIELD OF THE INVENTION

The present invention relates to transmission control systems and, more particularly, to an actuating mechanism for a transmission control system.

BACKGROUND OF THE INVENTION

Transmissions that shift gears by engaging one clutch mechanism while simultaneously disengaging another clutch mechanism are well known in the art. Tractors and the like, which operate under heavy loads, are known to include transmissions having several power-shift clutches which are selectively operated by a single shift lever. Such clutches are arranged in series such that a sequence of successively higher gear ratios, from neutral to an Nth speed, are obtained as the shift lever is selectively moved from one position to another. Such transmissions usually develop relatively high torque and relatively low speed outputs.

Many of such transmissions have hydraulically actuated powershift clutches which operate in response to a pressurized fluid flow thereto. Unless fluid flow to each respective clutch is carefully regulated and controlled, however, such clutches impart rough shifts between gear ratios. Such rough shifts can jolt the vehicle, particularly if a shift is made under load.

To avoid such shifting problems between gear ratios, various systems have been proposed for controlling operation of the clutches. Such control systems usually include a series of spool valves disposed between a source of hydraulic fluid pressure and the transmission clutches. As is known, pressurized fluid flow to each clutch mechanism is determined as a function of the linear disposition of the particular spool valve associated with that clutch.

In one type of control system, each spool valve is reciprocally arranged in a valve body. Depending upon valve body design, each spool valve assumes two or more linear positions within the valve body. To move a spool valve from one position to another within the valve body, it is common to use an electric solenoid capable of producing a fluid output in response to a control signal being delivered to the solenoid. The fluid output of the solenoid is delivered to one end of an associated valve spool in a manner regulating its linear disposition within the valve body. The valve spool is usually returned to its initial position under the influence of a spring.

Alternatively, two electric solenoids, each capable of producing a fluid output in response to a control signal being delivered thereto, are associated with each valve. The fluid output of one electric solenoid controls movement of the spool valve in one linear direction. The fluid output of the other solenoid controls movement of the spool valve in the opposite linear direction. As will be understood, two electrically controlled, fluid output solenoids provide a more positive and generally quicker spool valve operation.

Other control systems are designed such that one or more reciprocal spool valves assume three different operable positions for controlling fluid flow through the valve body. A spool valve which is positioned in any of three operable positions usually has two electrically controlled, fluid output solenoids and a spool centering spring associated therewith. The fluid output of one solenoid moves the spool valve to one operable position. The output of the other solenoid moves the spool valve to its second operable position. The spool centering spring locates the spool valve in its third operable position.

Therefore, a control system having a valve body with three reciprocal spool valves, each of which assumes one of three operable positions, would require six solenoids along with three spool centering springs. In addition to the foregoing, electronics including logic circuitry for controlling operation of each solenoid would also be required.

Because of operating clearances within each valve spool and tolerance accumulations associated with each electric solenoid, synchronization of the three spool valves in such a control system can, at best, only be approximated. Moreover, if any of the electric solenoids or spool valves become "stuck" during their operation, severe damage may be incurred within the transmission.

SUMMARY OF THE INVENTION

In view of the foregoing, and in accordance with the present invention, there is provided an actuating mechanism for a control system which is considerably less complex and more positive in operation than that heretofore known. The actuating mechanism of the present invention lends itself to control systems having multiple position spool valves without extensive reliance on electronic controls such as that required of control system utilizing electrically energized, fluid output solenoid valves.

The actuating mechanism of the present invention is arranged in combination with a hydraulic control system. In its simplest form, the hydraulic control system includes at least one spool valve which is adapted to reciprocate in a valve body. The spool valve moves along a generally linear path in the valve body in a manner regulating fluid flow through the valve body as a function of the linear disposition of the spool valve. The actuating mechanism includes a rotatable cam having a specific cam profile. The cam is carried by the valve body and is rotatable about an axis extending substantially perpendicular to the linear path of movement of the valve. The valve is operably connected to the cam such that the cam profile controls the linear disposition of the valve relative to the valve body.

The linear or reciprocal path of the valve and the rotational axis of the cam are offset with respect to each other. Moreover, the cam defines a generally planar main surface and the cam profile is defined by an arcuate recessed cam track provided in said main surface.

The cam is preferably rotatably mounted in a housing. The housing, in turn, is secured to the valve body. The cam within the housing is rotated by a gear which is connected to a shift lever of the mechanism with which the control system is associated.

In accordance with another aspect of the invention, the actuating mechanism is arranged in combination with a transmission control system including a valve body having at least two spool valves. Each valve includes a valve spool which is reciprocally arranged in the valve body for movement along a linear path. The linear disposition of each spool regulates operation of a transmission clutch. The actuating mechanism includes a rotatable cam carried by the valve body for positively controlling the linear disposition of each spool relative to the valve body. The cam is rotatable about an axis extending substantially perpendicular to the linear path of each valve.

The cam defines at least two arcuate tracks. One track controls the linear disposition of one valve. The other track controls the linear disposition of the other valve. The tracks provide each valve with at least two different linear positions within the valve body. One arcuate cam track in disposed a greater radial distance from the rotational axis of the cam than is the other cam track.

Each valve spool includes a pin which projects into one or the other of the cam tracks. The centerline of one valve is spaced from the rotational axis of the cam by a first distance. The centerline of the other valve is spaced from the rotational axis of the cam by a second distance. The radius of one track is greater than the first distance and the radius of the other track is greater than the second distance. The track with the largest radius controls the linear disposition of that spool valve whose centerline is spaced farthest from the rotational axis of the cam.

In accordance with a further aspect of the invention, there is provided an actuating mechanism for a transmission control system comprising a valve body having at least three valves. Each valve includes a valve spool which is arranged in the valve body for movement along a linear path and in a manner controlling operation of a particular transmission clutch. The actuating mechanism of the control system includes a rotatable cam carried by the valve body. The cam is rotatable about an axis extending substantially perpendicular to the linear path of each spool valve operated thereby. Each valve is operably connected to the cam such that rotation of the cam selective positions each valve spool relative to the valve body and in a synchronized manner relative to each other.

The centerline of each valve is preferably spaced from the rotational axis of the cam. Moreover, each valve spool is disposed in the valve body to assume any of three different operable positions.

The cam of the actuating mechanism is rotated by a gear. The gear is connected to shift lever of a transmission. Preferably arranged in combination with the gear is an indexing mechanism for facilitating rotation of the cam through a predetermined angle.

The cam defines three recessed channels or cam tracks. Each cam track has an arcuate and stepped configuration. The stepped configuration of the cam track and the centerline of the valve spool controlled thereby define a shear angle therebetween. The shear angle between the stepped configuration of the track and the spool valve is preferably greater than about 35 degrees. Each track positively moves one spool valve through its three positions in response to rotation of the cam.

The centerline of one spool valve is spaced from the rotational axis of the cam by a first distance and the centerline of at least one of the other spool valves is spaced from the rotational axis of the cam by a second distance. One track defined by the cam has a radius which is greater than the first distance and at least one of the other tracks has a radius which is greater than the second distance. The track with the largest radius controls the linear disposition of that spool valve whose centerline is spaced farthest from the rotational axis of the cam.

The actuating mechanism of the present invention is simple and positive in operation. Moreover, because the cam tracks can be arranged on the cam in a predetermined relationship relative to each other, synchronized movement of the valve spools in the valve body is assured without involving the use of expensive electronic circuitry. Moreover, the number of valves which are controlled by this device and the number of positions which each valve can assume is limited only by the size of the cam desired to be used for the particular application.

Others features and advantages of the present invention will become readily apparent from the following detailed description, appended drawings, and accompanying claims.

BRIEF DESCRIPTION OF THE DRAWINGS

FIG. 1 illustrates a fluid control system with a fragmentary showing, partially in section, of a control valve with an actuator mechanism, embodying the principles of the present invention, operably associated therewith;

FIG. 2 is a sectional view taken along line 2—2 of FIG. 1; and

FIG. 3 is a fragmentary view similar to FIG. 1 with the actuator mechanism rotated to another position.

DETAILED DESCRIPTION OF A PREFERRED EMBODIMENT

While the present invention is susceptible of embodiment in various forms, there is shown in the drawings, and will hereinafter be described, a presently preferred embodiment of the invention with the understand that the present disclosure is to be considered as an exemplification of the invention, and is not intended to limit the invention to the specific embodiment illustrated.

Referring now to the drawings, wherein like reference numerals indicate like parts throughout the several views, FIG. 1 illustrates a fluid control system 10. The fluid control system 10 comprises a control valve 12 and an actuating mechanism 14.

The control system 10 is provided to regulate operation of a fluid operated mechanism or apparatus. For example, control system 10 can be used to regulate operation of a transmission tractor or the like having a plurality of fluid operated powershift clutches preferably arranged in series relative to each other. It is to be understood, however, that the present invention is equally applicable to a myriad of other uses besides that provided by way of example.

In the illustrated embodiment, control valve 12 includes three valves 16, 18 and 20. Valves 16, 18 and 20 are each adapted for independent reciprocation in a valve body 22. Valve body 22 is preferably bolted or otherwise secured to a housing of the mechanism to be controlled and is fluidically connected to a source of fluid pressure. In the illustrated embodiment, valve body 22 defines two spaced-apart, axial bores 24 and 26. Depending on the particular design, bores 24 and 26 may be open at opposite ends.

Bore 24 has a plurality of axially spaced ports. As is conventional, some of the ports define inlet ports while other ports in bore 24 define discharge ports. Valve 16 includes a valve spool 28 which is slidably disposed in bore 24 and is axially shiftable along a linear path indicated in FIG. 1 by reference numeral 29.

A series of lands and grooves are precisely located on the periphery of the spool 28. The formation and positioning of such lands and grooves on the spool 28 are well known to those skilled in the valve spool art.

As will be appreciated, spool 28 and axial bore 24 cooperate to define at least one fluid flow path between the ports of bore 24. Such flow path is axially shiftable by movement of the spool 28 within the bore 24. Preferably, the spool 28 is movable to any of three different operable positions for controlling fluid flow through the valve body 22.

In a similar manner, bore 26 has a plurality of axially spaced ports. As is conventional, some of the ports in bore 26 define inlet ports while other ports in bore 26 define discharge ports. Valves 18 and 20 include two separate and independent valve spools 30, 32, respectively. Each spool 30, 32 is slidably disposed in bore 26 and is axially shiftable therein along a linear path indicated in FIG. 1 by reference numeral 33.

As will be appreciated, a series of lands and grooves on the periphery of spool 30 cooperate with axial bore 26 to define at least one fluid flow path between the ports of bore 26. Such flow path is axially shiftable as a function of the linear position of spool 30 within bore 26. As with valve 16, spool 30 is capable of assuming at least three different operable positions within bore 24 for controlling fluid flow through the valve body 22.

Valve 20 is axially aligned with, but independent from, valve 18. Valve 20 includes the valve spool 32 which is slidably disposed in bore 26 and axially shiftable therein.

As will be appreciated, a series of lands and grooves are provided on the periphery of spool 32 and cooperate with axial bore 26 to define another fluid flow path between the ports of axial bore 26. Such flow path is axially shiftable as a result of linear movement of spool 32 within bore 26. As in the other valves, spool 32 is capable of assuming any of three different operable positions for controlling fluid flow through the valve body.

A salient feature of the present invention is the actuation mechanism 14 for regulating the operable positions of each valve 16, 18 and 20 relative to the valve body 22. Actuating mechanism 14 includes a cam 34 rotatably mounted within a housing 36.

As seen in FIG. 2, housing 36 is bolted or otherwise secured to a mounting surface 38 of the valve body 22. Housing 36 defines a chamber 40 in which cam 34 is rotatably mounted.

Cam 34 defines a planar cam face 42 on one side of the cam and a gear 44 on the opposite side of the cam. Cam 34 is mounted such that the cam face 42 thereof is disposed closely adjacent the mounting surface 38 of the valve body 22. Gear 44 is preferably formed as an integral part of the cam. Cam 34 is fabricated from any suitable metallic or plastic material.

As best illustrated in FIG. 2, cam 34 is mounted for rotation about a pin 46 whose longitudinal axis 48 defines the rotational axis for the cam. Suitable bearing means 49 are interposed between pin 46 and cam 34 to reduce friction therebetween.

Returning to FIG. 1, cam 34 has a specifically designed cam profile for controlling the linear disposition of each valve 16, 18 and 20. As illustrated, the cam profile includes three arcuate tracks 50, 52 and 54. As seen in FIG. 2, each track is defined by a recessed channel having side walls 55 and 57 which are joined by a rear wall 59. Each track is cast or machined into the planar face 42 of the cam at various radii such that they do not intersect each other.

In the illustrated embodiment, each cam track 50, 52 and 54 has a distinctive profile for controlling movement of the particular valve associated therewith. As illustrated, cam track 50 has a stepped profile comprised of three separate spiral track segments 56, 58 and 60. It will be understood, however, that the particular profile of each track is designed according to the particular movement to be imparted to the valve associated therewith.

As illustrated, each spiral track segment on cam track 50 extends approximately 120 degrees about cam face 48 and is joined to an adjacent track segment by an angled transition segment 62. It should be appreciated, however, that cam track 50 can extend more or less than 360 degrees if so desired. Moreover, each spiral track segment 56, 58 and 60 forming cam track 50 includes three distinct radial sections shown as 64, 66 and 68 for track segment 60. It will be appreciated, however, that track segments 56 and 58 each include three distinct radial sections which correspond to those illustrated but are not specifically identified for purposes of clarity. Each radial section is concentric to, but extends a different radial distance from, the rotational axis 48 of cam 34. The different radial sections in each radial segment are joined to each other by angled transition sections 70. In this embodiment illustrated, corresponding radial sections of different track segments are disposed the same radial distance from the rotational axis 48 of cam 34, thus providing the three operable positions for valve 16.

As illustrated, cam track 52 also has a stepped profile. Thus, for example, track 52 is comprised of larger radiused track segments 72 and smaller radiused track segments 74. The larger and smaller radiused track segments are joined by angled transition segments 76. The track segments 72 and 74 are equally spaced from the rotational axis 48 of the cam. The opposite ends of track 52 may be provided with a radiused track segment 77 having a radius different from both the smaller and larger radiused track segments 74 and 72, respectively, thus providing three operable positions for valve 20.

In its preferred form, cam track 54 has a stepped profile comprised of three separate radial track segments 78, 80 and 82. As illustrated, each radial track segment forming cam track 54 is concentric to, but spaced a different radial distance from, the rotational axis of cam 34, thus providing the three operable positions for valve 18. Each radial track segment forming cam track 54 extends approximately 120 degrees about cam face 48 and is joined to an adjacent radial track segment by an angled transition segment 84. It should be appreciated, however, that cam track 54 can extend more or less than 360 degrees if so desired and each radial segment forming cam track 54 could be radially lengthened or shortened, depending upon the particular movement required for the associated valve.

Again referring to FIG. 2, each valve 16, 18 and 20 is connected to the cam 34 such that the linear position of each valve is controlled as a function of the rotational disposition of the cam 34. In that the connection between each valve and the cam is substantially similar, only the connection between valve 16 and cam 34 will be described in detail with the understanding that a similar connection is provided for the other two valves.

The valve spool of each valve is provided with an axially extended land 86. Land 86 defines a radial opening or aperture 88 for accommodating one end of a transversely extending pin 90. The free end of each pin 90 has a diameter substantially equal to the lateral spacing between side walls 55, 57 of each track in the cam 34. As such, pin 90 follows the profile of that track with which it is associated. Intermediate its ends, each pin 90 passes through an elongated slot 92 defined by the valve body 22. Suitable bearing means 94 are telescopically arranged over that portion of the pin 90 passing through the slot 92 to reduce frictional forces resulting from the pin 90 sliding along the slot 92.

As seen in FIG. 1, the rotational axis 48 of cam 34 is offset from the linear path of movement of each of the valves 16, 18 and 20. In the embodiment illustrated, the reciprocal path 29 of valve 16 is spaced from the rotational axis of the cam by a first distance D1. The reciprocal path 33 of valves 18 and 20 is spaced from the rotational axis 48 of cam 34 by a second distance D2. To achieve the best results, the radius of any track segment of track 50 is greater than distance D1 and the radius of any track segment of tracks 52 and 54 is greater than the second distance D2. Preferably, the track with the largest radius controls the linear disposition of that valve whose centerline is spaced farthest from the rotational axis of the cam.

A gear or rack 94 intermeshes with gear 44 for rotating cam 34. Gear 94 is operably connected to a transmission shift lever (not shown) and moves therewith. Preferably arranged in combination with the gear or rack 94 is an indexing mechanism for facilitating rotation of the cam through one or more predetermined angular steps $\phi$. Such an indexing mechanism is preferably hydraulically operated and may be of the type disclosed in my co-pending U.S. patent, Ser. No. 204,575, filed June 9, 1988. As disclosed therein, such an indexing mechanism includes a pair of detents 96 and 98 which are resiliently urged against a stepped peripheral surface of the cam to provide assistance to the operator for rotating the cam 34.

At the onset of control system operation, the pins 90 associated with each valve 16, 18 and 20 are preferably arranged at an extreme end of each track 50, 52 and 54. As such, each valve 16, 18 and 20 is positively located in an initial position.

The operator then moves the transmission shift lever sufficiently to engage a particular gear ratio for the transmission. As a result of transmission shift lever movement, rack 94 is moved in a manner rotating the cam 34 through a preselected angular rotation.

As cam 34 is rotated, tracks 50, 52 and 54 will control the linear displacement of each valve 16, 18 and 20 within the valve body 22 and thereby regulate fluid flow through the valve body. More specifically, as cam 34 is rotated, each track 50, 52, 54 will force the pin 90 associated with that track to follow the individualized profile of each track and linearly shift sideways in the slot 92 in the valve body 22 depending on the amount of radial shift between track segments. Understandably, sideways movement of a pin 90 results in corresponding linear displacement of a valve associated therewith according to the particular track configuration. The profile or shape of each track is individually designed to provide a predetermined amount of linear displacement for a given mount of cam rotation.

As can be seen from FIG. 3, when cam 34 is rotated, the angled transition segments which join adjacent, but radially spaced, track segments are inclined at a shear angle $\alpha$ to the reciprocal path of the valve spool. The size of the shear angle $\alpha$ depends, in large part, on the coefficient of friction between pin 90 and the sides 55, 57 of each cam track. Typically, shear angle $\alpha$ will be greater than 35 degrees. The use of a larger shear angle ensures that the force actually applied to each pin 90 by the tracks 50, 52 and 54 to radially shift each pin 90 from one track segment to another is as large as possible so that the effort which must be applied to rotate the cam 34 to shift the spool is as low as possible.

From the foregoing, it should be appreciated that the various track segments of each track 50, 52 and 54 are arranged on the cam 34 relative to each other to effect synchronized movement of the valves 16, 18, 20 relative to each other. Cam tracks 50, 52 and 54 impart positive movement to each of the valve spools whereby assuring proper operation of the valves 16, 18 and 20. A combination of tracks as shown will allow the valves to be shifted to their respective operative positions simultaneously to select combinations of clutches to be activated/deactivated whereby providing a sequence of successively higher gear ratios from neutral to Nth speed as the cam is rotated.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to be covered by the appended claims all such modifications as fall within the scope of the claims.

What is claimed is:

1. An actuating mechanism for a hydraulic control system including a valve arranged in a ported valve body for reciprocal movement along a generally linear path in a manner regulating fluid flow through said valve body as a function of the linear disposition of said valve, said actuator mechanism comprising:
    a rotatably driven cam mounted to said valve body, said cam being rotatable about an axis extending substantially perpendicular to the linear path of said valve and defines at least one cam track having at least two interconnected spiral segments; and
    cam follower means for connecting said valve to said cam, one end of said cam follower means engaging said cam track such that said valve is driven and positively positioned in opposite directions within said valve body between at least two different positions as a function of cam rotation.

2. An actuating mechanism according to claim 1 wherein the linear path of said valve and the rotational axis of said cam are offset with respect to each other.

3. An actuating mechanism according to claim 1 wherein said cam defines a generally planar main surface and said cam track is defined by an arcuate recessed channel in said main surface.

4. An actuating mechanism according to claim 1 wherein said cam is rotated by a gear.

5. An actuating mechanism according to claim 1 wherein said cam is rotatably mounted in a housing which is secured to the valve body.

6. An actuating mechanism according to claim 1 wherein said cam is rotatably indexed by a pair of detents which act against a peripheral surface of the cam.

7. An actuating mechanism arranged in combination with a transmission control system, said control system including a valve body having at least two valves reciprocally arranged therein for movement along linear paths and whose linear disposition in said valve body regulates operation of various transmission clutches, said actuating mechanism comprising:
    a driven cam rotatably carried on a mounting surface defined by said valve body, said cam being rotatable about an axis extending substantially perpendicular to the linear path of each of said valves and defines first and second cam tracks, said first cam track controlling the disposition of one valve relative to said valve body and having at least two interconnected segments, said second cam track controlling the disposition of the other valve relative to said valve body and having at least two interconnected segments; and means extending through said valve body for interconnecting the valves with the cam and such that the tracks on the cam individually and positively position each valve in opposite directions between at least two different positions as a function of the rotational disposition of the cam.

8. An actuating mechanism according to claim 7 wherein the longitudinal centerline of the valves is offset from the rotational axis of the cam.

9. An actuating mechanism according to claim 7 wherein said interconnecting means includes a pin extending from each valve and which projects into one or the other of said tracks.

10. An actuating mechanism according to claim 7 wherein one of said cam tracks is disposed a greater radial distance from the rotational axis of said cam than is the other cam track.

11. An actuating mechanism according to claim 7 wherein said cam is rotatably indexed by a pair of detents which act against a stepped peripheral surface of the cam.

12. An actuating mechanism according to claim 7 wherein the centerline of one valve is spaced from the rotational axis of said cam by a first distance and the centerline of the other valve is spaced from the rotational axis of the cam by a second distance.

13. An actuating mechanism according to claim 12 wherein the radius of one track is greater than said first distance and the radius of said other track is greater than said second distance.

14. An actuating mechanism according to claim 13 wherein the track with the largest radius controls the linear disposition of that valve whose centerline is spaced farthest from the rotational axis of the cam.

15. An actuating mechanism for a transmission control system comprising a valve body having at least three valve spools arranged in said body for movement along linear paths and in a manner controlling operation of various transmission clutches, said actuating comprising:

a driven cam rotatably mounted on an exterior surface of said valve body and rotatable about an axis extending substantially perpendicular to the linear path of each of said valve spools, said cam defining at least three radially spaced segmented tracks, each segment in a track being joined to another segment by a transition segment; and means extending through said valve body for connecting each of said valve spools to said cam, one end of each connecting means engaging a track and another end of each connecting means engaging a valve spool such that rotation of said cam selectively position each valve spool relative to said valve body in a positive and and synchronized manner relative to each other.

16. An actuating mechanism according to claim 15 wherein the centerline of each of said valve spools is spaced from the rotational axis of said cam.

17. An actuating mechanism according to claim 15 wherein said cam is rotated by a gear.

18. An actuating mechanism according to claim 15 wherein the centerline of one valve spool is spaced from the rotational axis of said cam by a first distance and the centerline of at least one of the other valve spools is spaced from the rotational axis of the cam by a second distance.

19. An actuating mechanism according to claim 15 wherein the radius of one track is greater than said first distance and the radius of at least one other track is greater than said second distance.

20. An actuating mechanism according to claim 19 wherein the track with the largest radius controls the linear disposition of that valve spool whose centerline is spaced farthest from the rotational axes of the cam.

21. An actuating mechanism according to claim 15 wherein said cam defines a plurality of recessed channels defining said tracks, and wherein the transition segment of each track and the centerline of the respective valve spool define a shear angle therebetween.

22. An actuating mechanism according to claim 21 wherein said shear angle is greater than about 35 degrees.

* * * * *